United States Patent

[11] 3,563,270

| [72] | Inventor | Carl B. Denny |
| | | Mc Ewen, Tenn. |
| [21] | Appl. No. | 848,953 |
| [22] | Filed | Aug. 11, 1969 |
| [45] | Patented | Feb. 16, 1971 |
| [73] | Assignee | Scovill Manufacturing Company |
| | | Waterbury, Conn. |
| | | a corporation of Connecticut |

[54] VALVE FOR VEHICLE-LEVELING SYSTEM
10 Claims, 10 Drawing Figs.

[52] U.S. Cl. ................................................ 137/625.21,
251/54, 280/6.1
[51] Int. Cl. ............................................... F16k 11/02,
F16k 31/12
[50] Field of Search .......................................... 137/625.21
625.24; 251/54; 280/6, 6.1, 6.11, 43.23

[56] References Cited
UNITED STATES PATENTS
| 2,431,659 | 11/1947 | Flounders.................. | 251/54 |
| 2,844,167 | 7/1958 | Griswold .................. | 137/625.21 |
| 2,929,621 | 3/1960 | Christensen.............. | 251/54X |

*Primary Examiner*—William R. Cline
*Attorney*—Dallett Hoopes

ABSTRACT: Valve for vehicle-leveling system includes valve plate apertured to provide precise control of "null band" as plate moves in its plane. Simple dashpot means delays action of valve until it is clear that out-of-level condition is not from road action.

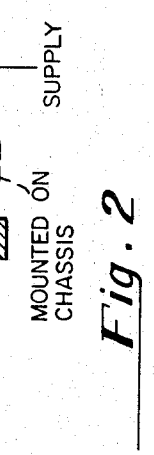
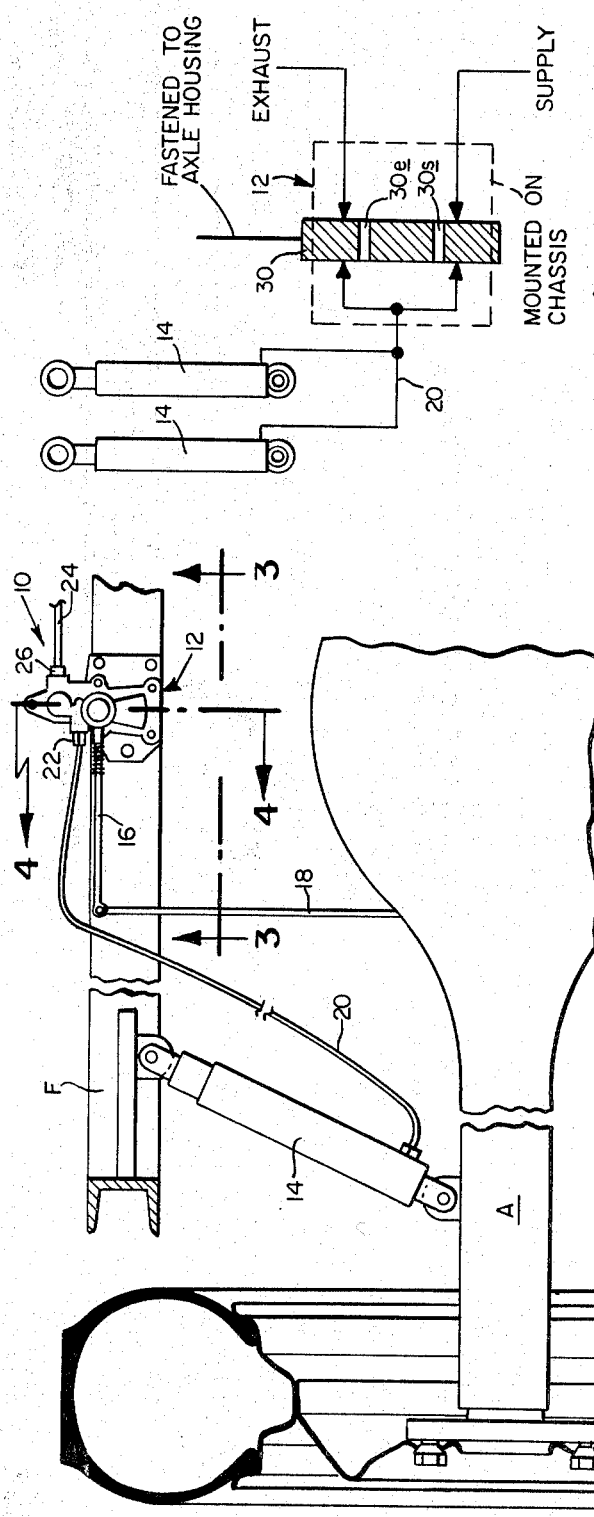
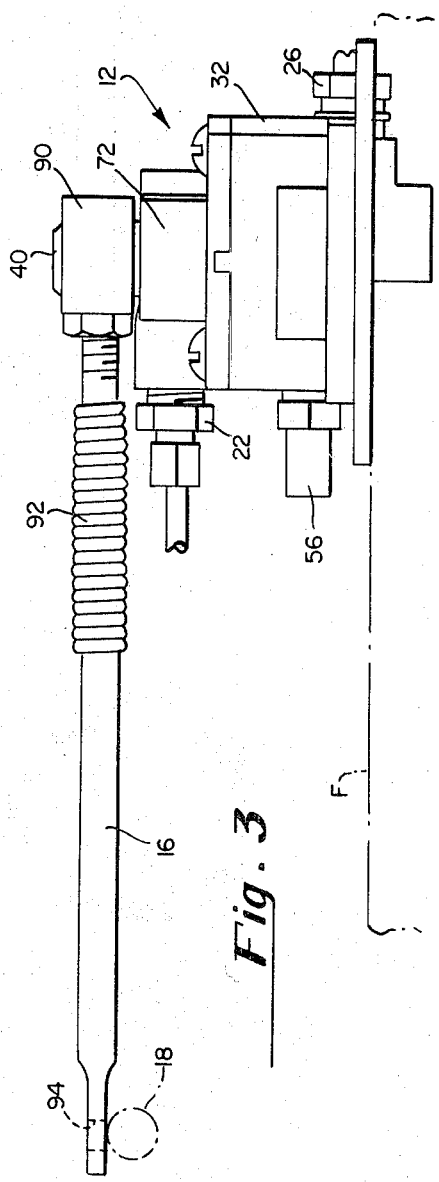
INVENTOR.
CARL B. DENNY
BY Dallett Hoopes
ATTORNEY.

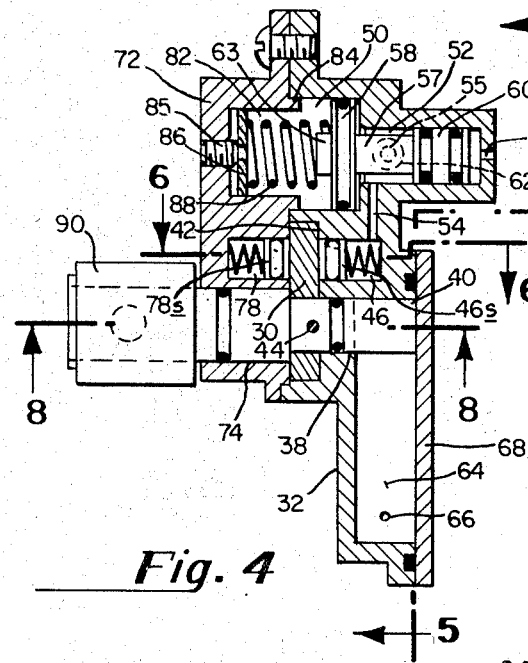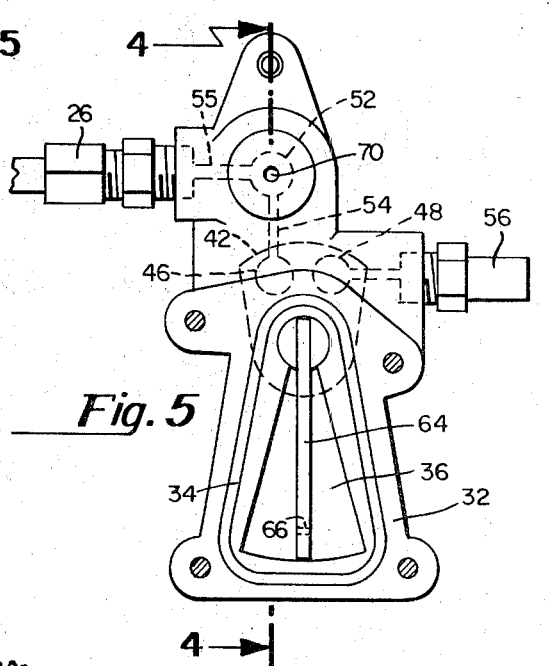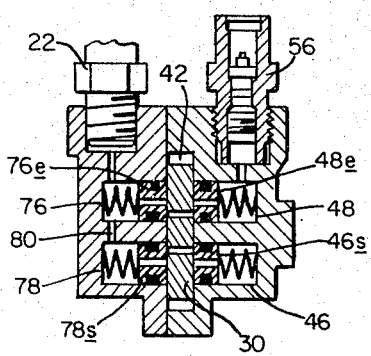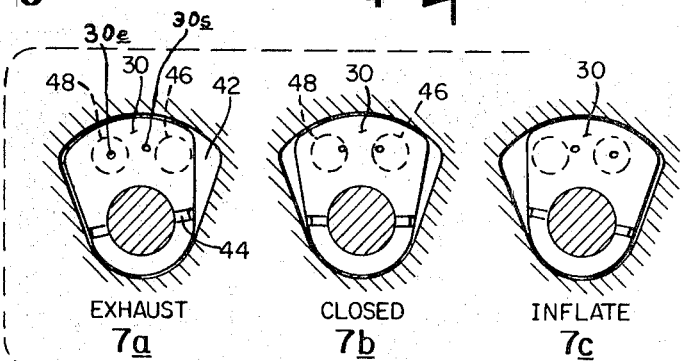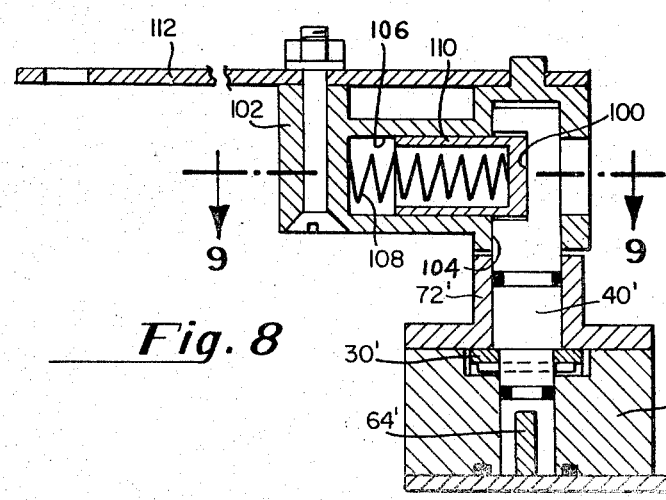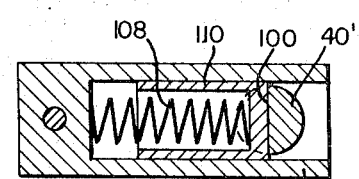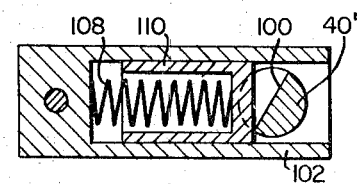
INVENTOR.
CARL B. DENNY

VALVE FOR VEHICLE-LEVELING SYSTEM

This invention relates to a control valve for a vehicle leveling system. More specifically, this invention relates to a valve having very sensitive operating characteristics in the performance of the leveling operation and at the same time is simple, rugged and dependable.

In the prior art, there are many arrangements for leveling the frame of an automobile. The present invention is an improvement on the valves of the prior art in that it provides simple dashpot means for delaying the operation of the valve so that no adjustment will be made for transient out-of-level condition due to road action. At the same time, the present invention permits precise selection of the width of the "null band" or zone in which the valve does not correct the more permanent out-of-level condition of the car due to uneven load distribution. In a preferred embodiment, the valve includes a built-in pressure regulator to protect the modified shock absorbers or other motor means which carry out the leveling function. The proximity of the regulator to the leveling valve gives close control of the air pressure for the system.

Other objects of the invention will be apparent to one skilled in the art after reading the following specification including the drawings wherein:

FIG. 1 is a simplified diagrammatic view looking rearward at a portion of the rear axle of an automobile having the valve of the present invention installed thereon and in use;

FIG. 2 is a very schematic view showing how the valve of the present invention functions to control the system;

FIG. 3 is a greatly enlarged view of the valve and actuating arm taken on the line 3–3 of FIG. 1;

FIG. 4 is an enlarged sectional view of the valve embodying the invention taken on the line 4–4 of FIG. 1;

FIG. 5 is an enlarged view taken on the line 5–5 of FIG. 4;

FIG. 6 is a sectional view taken on the line 6–6 of FIG. 4;

FIGS. 7a, 7b and 7c are views of the valve plate showing it in the three various positions;

FIG. 8 is an enlarged sectional view taken on the line 8–8 of FIG. 4 but showing a modified form of actuating arm from that shown in FIG. 3;

FIG. 9 is a fragmentary sectional view taken on the line 9–9 of FIG. 8; and

FIG. 10 is a sectional view similar to FIG. 9 but showing the actuating arm and drive shaft in a temporary condition of nonalignment.

Referring more specifically to the drawings, a portion of a system employing a valve embodying the invention is generally designated 10 in FIG. 1. It comprises the valve 12 and a modified shock absorber 14 which may be a standard shock absorber having a leak-free air bag or air-adjustable cylinder surrounding the connecting rod. Such modified shock absorbers are available under the trademark "Pleasur-Lift" from Delco Division of General Motors, for instance. As shown, the valve is mounted on the frame F and is equipped with an actuating arm 16 which is operatively connected by an appropriate pivoted linkage 18 to a portion of the axle adjacent the differential housing.

One end of the shock absorber 14 is pivotally connected to the axle and the other end is pivotally connected to the frame. A hose 20 interconnects internal chamber of the shock absorber and the control port fitting 22 of the valve. Behind the port fitting 22 is the exhaust opening (not shown) for the system. Compressed air supply (not shown) is communicated to the valve through a second hose 24 connected to the valve 12 by a supply fitting 26.

It will be understood that a second shock absorber 14 (not shown) and hose 20 are connected from the fitting 22 and mounted on the opposite side of the car in a fashion similar to that shown in FIG. 1.

It will further be recognized that the simplified diagrammatic drawing in FIG. 1 does not show the conventional coil or leaf springs of the vehicle.

Referring now to FIG. 2, the basic operation of the system will be explained. The hose 20 running from the modified shock absorbers 14 comes within the valve 12 with relatively fixed and spaced ports or bushings designated by rightwardly directed arrowheads in FIG. 2 and which press against one face of a valve plate 30 which is movable relative to the ports in vertical directions as shown in FIG. 2. Disposed against the opposite face of the plate 30 and relatively fixed are respective supply and exhaust ports which are in axial alignment with the shock absorber ports respectively and are designated by the leftward directed arrowheads in FIG. 2.

In FIG. 2, for schematic purposes, the valve housing, designated by the dotted outline, is secured to the vehicle frame and stationary along with the ports inside it. The valve plate 30 is connected through means not shown, of course, in FIG. 2 to the axle housing, thus a relative movement between the frame and the axle housing will cause a corresponding movement of the valve plate 30 relative to the stationary ports designated by the arrowheads.

The plate 30 as shown is formed with vertical spaced horizontal passages 30s and 30e. Thus, when the distance between the axle housing and the frame is altered, the plate 30 as shown in FIG. 2 will raise causing the passage 30e to align and communicate with the upper arrowheads and permit exhaust of the shock absorbers 14 causing downward adjustment of the frame. When the distance between the frame and axle housing changes downward as when the load is placed in the rear of the vehicle, the plate 30 as shown in FIG. 2 will drop correspondingly so that the passage 30s will align with the lower pair of arrowheads to communicate a supply to the shock absorbers 14 causing the shocks to exert upward force and raise the frame. It will be noted that as long as the relation between the frame and the axle housing is such that the two passages 30e and 30s are disposed between the two pairs of arrowheads, the amount of air held in the shock absorbers will remain constant.

Referring more specifically to the valve embodying the invention shown in the drawings, it comprises an irregular housing 31 32 (FIG. 4) having a pie-slice-shaped portion 34 which is hollowed out to present the dashpot cavity 36 (FIG. 5). Toward the upper end of the cavity, the housing is bored through to present an operating passage 38 for the actuating shaft 40.

Around and upward from the passage 38 on the other side of the housing is a fan-shaped recess 42 in which is disposed the lobe-shaped valve plate 30 which is keyed as at 44 to the shaft 40. The recess 42 is formed with a pair of spaced wells 46 and 48. The wells 46 and 48 receive respectively spring-pressed plastic bushings 46s and 48e. The bushings as shown are reciprocally mounted in their respective wells and are surrounded with O-rings to seal against the walls thereof. Their respective springs press their leftward faces (FIG. 6) against the plate 30.

Disposed in the upward portion of the housing 32 above the cavity 42 is a circular recess 50 which extends coaxially deeper in a reduced hole 52 which extends into a rightward cylindrical protuberance in the upper portion of the housing (FIG. 4). A passage 54 within the housing extends from the hole to the well 46 communicating the two. In manufacture, this passage may be drilled down through the top of the housing and that portion of the passage above the hole 52 may be closed off. A second passage 55 extends from the supply fitting 26 to the hole 52.

An exhaust fitting 56 (FIG. 5) is mounted in the rightward side of the housing and may contain an ordinary short-type standard bore valve core. It communicates through a passage to the well 48. The core is, of course, mounted in the fitting as a popoff valve to permit passage of air above a certain pressure (e.g. 12 p.s.i.g.) from the inside of the housing out, but not he the other way. A screen at the end of the fitting keeps dirt out of the valve core.

A pressure regulator piston 57 (FIG. 4) is reciprocally mounted in the recess 50 and hole 52. It comprises the larger end 58 and the smaller end 60 with a necked-in portion 62 in-between. A central leftward projection 63 is disposed on the larger end 58. The two ends of the piston are equipped with peripheral grooves and fitting O-rings to seal the ends against the walls of the recess 50 and the hole 52 respectively.

As shown in FIG. 5, the end of the actuating shaft 40 is slotted and receives the rigid dashpot vane 64. The vane may carry a fluid passage hole 66 to shorten its time of operation, if desired. In use, the cavity 36 is filled with some viscous fluid (e.g., a silicone oil) and a closing plate 68 which may serve also as a mounting plate is bolted over the cavity. Sealing means are provided on the actuating shaft 40 and the housing about the cavity opening to retain the viscous fluid within the cavity.

As shown in FIG. 4, the rightward end of the protuberance in the upper portion of the housing 32 is vented to the atmosphere as at 70.

A housing cover 72 is bolted to the left side of the housing. The cover is formed with a hole 74 to permit passage of an enlarged portion of the actuating shaft 40 above the hole 74. A pair of spaced wells 76 and 78 align with the wells 48 and 46 respectively in the housing. These wells carry spring-pressed bushings 76e and 78s respectively which are pressed by their springs against the leftward face of the valve plate 30. The bushings are provided with O-rings sealing them within their wells.

As shown in FIG. 6, the shock absorber fitting 22 communicates through passage 80 with both wells 76 and 78. Above the wells in the housing cover there is formed a spring receiving recess 82 which terminates in a stop lip 84 which fits into the mouth of the opening 50 in the housing 32. The bottom wall of the recess 82 is drilled and tapped to receive an adjusting screw 85, the inner end of which is reduced and fits into a central opening in the spring base plate 86 disposed in the recess. An axial spring 88 is disposed between the plate 86 and against the end 58 of the piston. It is held in position by the protuberance 63 on the piston end.

As shown in FIG. 3, the outer end of the shaft 40 is encircled by a collar 90 drilled and tapped to receive the actuating arm 16. The arm may be interrupted as shown, and rejoined by a stiff spring 92 to permit some flexibility thereof. The outer end of the arm 16 is flattened and apertured as at 94 to connect by suitable pin means to the linkage 18 which itself is connected to the housing as explained.

OPERATION

Assuming the proper space between the frame F and the axle housing A, the linkage 18 and the arm 16 are proportioned so that the rod 40 disposes the valve plate 30 in the position shown in FIGS. 2 and 6. In this position, both passages 30s and 30e are between and in nonalignment with the openings of the bushings 78s, 46s and 76e, 48e respectively. Thus, the condition of the valve is static and there is no change in the amount of air contained in the shock absorbers 14.

Suppose in traversing a rough road the wheel W encounters an obstacle and in passing over it moves upwardly in respect to the frame. This will cause an instantaneous upward movement of linkage 18 and a clockwise force on the arm 16. Corresponding rotation of the shaft 40 will, however, be inhibited by the vane 64 which is housed in the viscous-liquid-containing cavity 36. Before force is exerted on the vane 64 sufficiently long to cause its movement in the cavity, the instantaneous force will be absorbed by the spring 92 in the actuating arm 16 and the wheel W will have returned to its normal position prior to any rotary movement of the shaft 40 significant enough to move the valve plate 30.

The same situation will apply should the wheel W encounter a sudden depression in the road. Before the force exerted on the vane 64 is of sufficient strength and/or duration to rotate the shaft 40, the downward force on the arm 16 will have been absorbed by the spring 92 and the arm 16 will have returned to its straight disposition because the road depression has been passed.

Now, suppose the instantaneous deflection of the wheel W is substituted by a more permanent deflection with respect to the frame F as by the entry into the rear of the car by three heavy passengers. This will cause a relatively permanent lowering of the frame F with respect to the wheel W and axle housing A. The linkage 18 will exert an upward force on arm 16 which will be of a permanent nature causing the spring 92 to transmit a permanent rotary force to the rod 40 urging the vane 64 in a rightward direction.

As the vane 64 slowly moves through its heavy viscous medium, the valve plate 30 will correspondingly move and bring the passage 30s into alignment with the openings in the bushings 78s and 46s. This condition is shown in FIG. 7c. With the compressed air supply connected to the housing, the fitting 26 communicating through the bushing 46s, passage 30s and bushing 78s to the shock absorber fitting 22, there is immediately supplied to the shock absorber an additional quantity of air causing the shock 14 to extend. This raises the level of the frame F and causes the arm 16 to tend to restore to its position shown in FIG. 1. When it has reached this position long enough, and the vane 64 has returned to the position shown in FIG. 5, the plate 30 will be in a position shown in FIG. 6 and the supply to the shock absorber 14 will be cut off.

It will be understood that the time lag for operation of the leveling valve can be altered by selecting a fluid for dashpot cavity 36 of a different viscosity. A different range of time lags can be obtained by replacing the vane 64 with a different shaped vane changing clearances between the vane and the walls of the dashpot chamber.

Upon exiting of the three passengers from the rear of the car, the frame F will naturally rise with respect to the axle, driven up by the air in the modified shock absorber 14 and the springs of the car. Since the elevated disposition of the frame F is relatively permanent, the continued counterclockwise moment of the arm 16 will be transmitted to the spring 92 long enough to permit the vane 64 to move leftward (FIG. 5) in its viscous surrounding causing the plate 30 to assume the disposition shown in FIG. 7a wherein the plate opening 30e is in alignment with the openings in the bushings 48e and 76e, to permit escape of air out the exhaust check fitting 56. This causes the shortening of the shock 14 and there ensues the clockwise movement of arm 16 and the eventual return of the plate 30 to the position shown in FIG. 6 and 7b whereupon the desired relation between the frame F and the axle housing A is restored.

A special feature of the invention is the exact control of the leveling operation by the valve plate 30 in cooperation with the spring-pressed bushings. It will be noted from FIG. 7 that the openings 30e and 30s are small and that in the normal disposition (FIG. 7b) they are spaced between but closely adjacent the ports in the bushings. A slight movement in either direction causes the alignment of a selected opening 30s, 30e with the appropriate bushings. In actual practice, it has been found that as little a rotational shift as 10° in either direction from center position with respect to the axis of the rod 40 can effect the alignment of the holes as in FIG. 7a and 7c. In other words, the null band of the valve can be reduced to 20°. Further reduction of the null band by changing the position of the openings 30s and 30e is possible but for practical purposes, 20° seems sufficiently narrow a band for most applications.

It should be understood that the sidewalls of the cavity 42 form stops at either end of the travel of the lobe-shaped valve plate 30 and that while the side of the valve plate 30 engages such stops, the appropriate opening 30s and 30e, is in alignment with the supply or exhaust bushings.

MODIFICATION

A variation of the arm 16 is shown in FIG. 8. In this variation, the shaft 40' is formed with a flat 100 and the end of the shaft receives a spring casing 102 which is provided with the shaft receiving opening 104. A transverse well 106 is provided in the casing 102 and the well receives a stiff spring 108 which is provided with a cap 110. The end wall of the cap is flat and presses against the flat 100. A rigid arm 112 is secured to the casing.

By the arrangement shown in FIG. 8, a rotational movement of the arm 112 will not immediately effect corresponding rotation of the shaft 40. This is because the resisting force of the dashpot 64, 36 is sufficient to overcome the urging of the spring 108 acting on the flat 100. The continuous urging of the spring 108 will be sufficient to drive the shaft 40 in rotary movement as the vane 64 moves through its fluid until ultimately the normal (FIG. 9) relation of the flat end of the cap 110 to the flat 100 on the shaft 40 (FIG. 9) is once again established.

The version of the arm 16 shown in FIG. 8, though more complicated than the version in FIG. 3, is desirable in that the spring 108 is protected from dirt and the like and is not exposed to the road conditions. It may also be modified to include a set screw spring base plate arrangement (as at 85, 86 in FIG. 4) in the housing 102 to control compression on spring 108 so that torque on shaft 40 and hence time lag of dashpot 32, 64 may be altered.

The upper portion of the housing which encloses the piston 57 is a pressure regulator valve adapted upon the supply of high pressure thereto to shut off the supply and thereby protect the shock absorbers and other parts of the leveling system. This is a desirable but not essential adjunct to the valve of the invention. The operation of the pressure regulator valve is conventional. Air is supplied through fitting 26 and passage 55 to an opening into the hole 52 which, as shown in FIG. 4 in dotted lines, is normally the position of the neck 62 of the piston. Provided the air pressure is within the desired range, air passes directly through the passage 54 which is rightward of opening 55. If the pressure is too high, however, the high pressure working on the differential area between the piston ends 58 and 60 causes the piston to move leftward against the urging of the spring 88 to cause the smaller end 60 to close off the opening of passage 54 into the hole 52.

When air at a desired pressure is once again supplied to the passage 55, it will pass once again through passage 54 and into the valve. It will be seen that the force exerted on the piston by the spring 88 can be adjusted by the adjusting screw 84 which positions the plate 86.

It will be seen that the present valve will give precise, accurate, and sensitive control for a liquid leveling system. Its construction is simple and its performance is reliable.

I claim:

1. A control valve for a vehicle load leveling system comprising:
    a. a housing formed with a dashpot cavity and a valve plate cavity spaced laterally of the housing from the dashpot cavity;
    b. a rotatable drive shaft extending into the housing and intercepting both the dashpot cavity and the valve plate cavity;
    c. a stiffly yieldable actuating arm connected to an end of the shaft outside the housing;
    d. a dashpot movable element disposed in the dashpot cavity and connected to the shaft;
    e. a valve plate mounted radially on the shaft and disposed in the valve plate cavity and having orifice means therethrough; and
    f. shock absorber port means, fluid supply port means and fluid exhaust port means all disposed in the housing and having ends disposed against the valve plate, with one of the shock absorber port means disposed in axial alignment with the fluid supply port means with the plate inbetween, and the other of the shock absorber port means disposed in axial alignment with the fluid exhaust means with the plate inbetween, whereby when the drive shaft is in one rotary position, the shock absorber port means communicates through the orifice means in the plate with the fluid supply port means and when the drive shaft is in a second rotary position, the shock absorber port means communicates through the orifice means in the plate with the fluid exhaust port means.

2. A control valve as described in claim 1 wherein stop means are provided which permit movable movement of the shaft only from said one rotary position to said other rotary position and back and not beyond.

3. A control valve as described in claim 1 wherein each of the port means are at the same radius from the drive shaft and the orifice means comprise two openings at the same radius and spaced closer together than the fluid supply port and the fluid exhaust port.

4. A control valve as described in claim 3 wherein the arcuate difference between the spacing of the supply and exhaust ports and the two openings is less than 20° with respect to the shaft.

5. A control valve as described in claim 1 wherein the stiffly flexible arm is an interrupted rod coupled by a stiff axial spring.

6. A control valve as described in claim 1 wherein the stiffly flexible arm is a rigid element rotatably mounted on the shaft and having a stiff-spring-pressed cap the flat end of which works against a flat on the shelf shaft.

7. A control valve as described in claim 1 wherein the ports each comprise a spring-pressed plastic bushing pressing against the face of the plate.

8. A control valve as described in claim 1 wherein the fluid exhaust port means communicates to atmosphere through a short-type standard bore valve core.

9. A control valve as described in claim 1 wherein the housing additionally includes pressure regulator means disposed between the supply port means and a supply external of the housing.

10. A control valve as described in claim 1 wherein the dashpot movable element is a vane mounted on the shaft and the dashpot cavity is pie slice shaped and the shaft is disposed at the point of the slice.